United States Patent [19]

Fukuhara et al.

[11] Patent Number: 4,653,440
[45] Date of Patent: Mar. 31, 1987

[54] INTAKE SYSTEM FOR MULTICYLINDER INTERNAL COMBUSTION ENGINE

[75] Inventors: Kazuyuki Fukuhara; Yoshikiyo Shuzui, both of Toyota, Japan

[73] Assignee: Toyota Jidosha Kabushiki Kaisha, Aichi, Japan

[21] Appl. No.: 876,644

[22] Filed: Jun. 17, 1986

Related U.S. Application Data

[63] Continuation of Ser. No. 683,866, Dec. 20, 1984, abandoned.

[30] Foreign Application Priority Data

Aug. 16, 1984 [JP] Japan .......................... 59-124337[U]
Aug. 16, 1984 [JP] Japan .......................... 59-124338[U]

[51] Int. Cl.⁴ .................. F02B 75/20; F02M 35/10
[52] U.S. Cl. ......................... 123/52 MB; 123/52 M
[58] Field of Search ......... 123/52 M, 52 MB, 52 MC, 123/59 R

[56] References Cited

U.S. PATENT DOCUMENTS

| | | | |
|---|---|---|---|
| 3,374,775 | 3/1968 | Ferguson | 123/52 M |
| 3,811,416 | 5/1974 | Gospodar et al. | 123/52 M |
| 4,030,293 | 6/1977 | Hata | 123/52 M |
| 4,136,648 | 1/1979 | Ernest | 123/52 MC |

FOREIGN PATENT DOCUMENTS

| | | | |
|---|---|---|---|
| 1040845 | 10/1958 | Fed. Rep. of Germany | 123/52 M |
| 780802 | 5/1935 | France | 123/52 M |
| 48-34401 | 10/1973 | Japan . | |
| 56-49226 | 5/1980 | Japan . | |
| 57-28858 | 2/1982 | Japan . | |

*Primary Examiner*—Craig R. Feinberg
*Attorney, Agent, or Firm*—Kenyon & Kenyon

[57] ABSTRACT

A surge tank construction arranged in an intake system of a multicylinder internal combustion engine, the surge tank defining an expansion chamber having faced first and second inner walls. A tubular body in which a throttle valve is arranged is open to the expansion chamber at the first wall. A partition wall extends from the second wall toward the first wall and terminates at a position spaced therefrom so that portions of the expansion chamber divided by the partition wall and connected to the respective groups of cylinders are connected to each other.

4 Claims, 4 Drawing Figures

INTAKE SYSTEM FOR MULTICYLINDER INTERNAL COMBUSTION ENGINE

This application is a continuation of application Ser. No. 06/683,866, filed Dec. 20, 1984, now abandoned.

BACKGROUND OF THE INVENTION

1. Field of the Invention

The present invention relates to an intake system provided with a surge tank in an internal combustion engine.

2. Description of the Prior Art

A multicylinder internal combustion engine is usually provided with a surge tank arranged downstream of a tubular throttle body in which a throttle valve is arranged The surge tank has a volume expansion chamber and branch passageways connected to respective cylinders. The expansion chamber forms a nodal point of a pressure wave transmitted from the respective cylinders, which pressure wave is formed by alternate opening and closing of an intake valve. Therefore, the pressure wave is reflected as a nodal point from the expansion chamber to the respective cylinders, and thus an oscillatory movement of intake air takes place between the expansion chamber and the combustion chamber of the corresponding cylinder, generating a pulsating intake air movement. When the frequency of this pulsation corresponds to the open and close cycle of the intake valve, an effective intake action is attained which is called an "inertial intake" operation. Maximum efficiency is realized at a rotational speed of the engine which corresponds to the frequency of the pressure wave, resulting in a peak of torque obtained by the engine. The frequency of the intake air pressure wave is determined by the length of the intake passageway. The length of the intake passageway is usually determined so that a maximum torque characteristic is obtained at a low engine speed range.

The pressure wave generated in a cylinder at the respective intake strokes is weakened by the pressure wave generated in the intake port of another cylinder attaining subsequent intake strokes. Such an effect is called intake interference. When such an effect occurs, the increase in the output torque at the low speed range is decreased.

In order to prevent intake interference from occurring, a system is known wherein an expansion chamber is provided with a partition wall forming two sections separated from each other, the cylinders are divided into two groups between which ignition strokes take place alternately, and the divided groups are connected to the two divided sections, respectively (see Japanese Unexamined Patent Publication No. 48-34401). In this prior art, intake interference does not take place, and, therefore, an increased torque may be generated during an engine's low speed condition. However, this construction of the prior art causes the effective volume of the expansion chamber to be decreased due to the provision of the partition wall. Thus, the efficient use of air in the expansion chamber is decreased, causing a decreased torque during a high load condition of the engine.

SUMMARY OF THE INVENTION

The object of the present invention is to provide a surge tank construction capable of providing a more flattened torque at every rotational speed of the engine.

According to the present invention, an intake system for an internal combustion engine is provided with a plurality of cylinders divided into first and second groups between which ignition strokes alternately take place. Said system comprises a tubular body through which intake air passes, an expansion chamber defining faced first and second inner walls, said tubular body being open to the expansion chamber at the first wall, means for defining a plurality of intake passageways each having a first end connected to the expansion chamber and a second end connected to the corresponding cylinder, and means for defining an inner partition wall in said chamber, which partition wall extends from the second wall toward the first wall and terminates at a position spaced from the first wall so that the chamber is divided into first and second portions, connected to the first and second cylinder groups, respectively, and so that a communication passageway is formed between the partition and the second wall for communicating the first and the second expansion chamber portions with each other.

DESCRIPTION OF THE PREFERRED EMBODIMENTS

Figure 1:
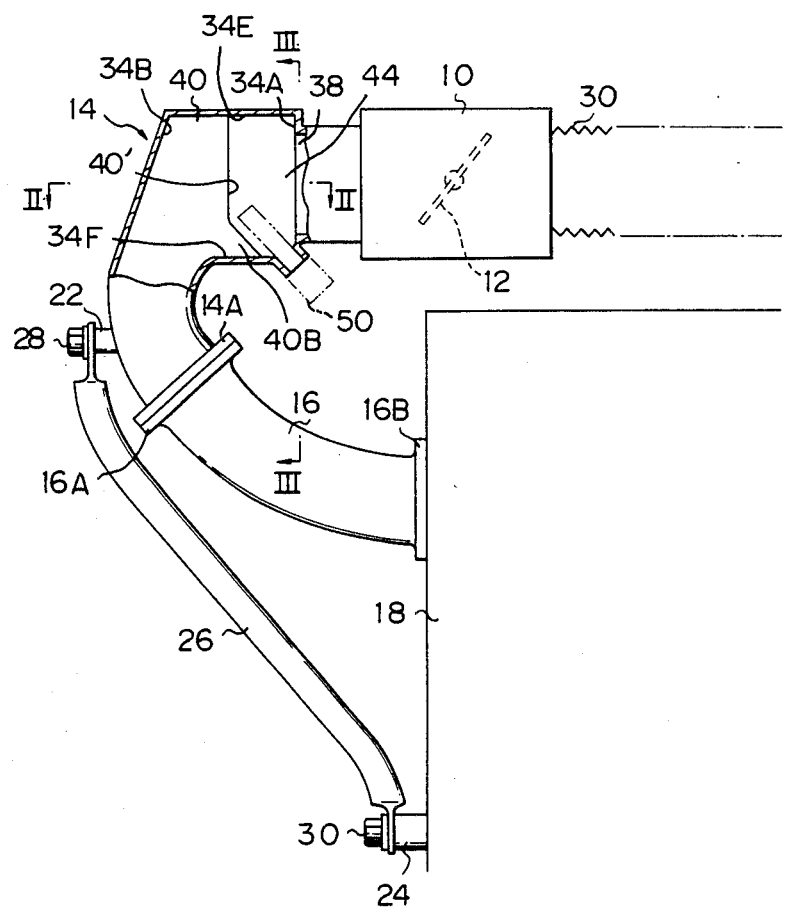
FIG. 1 shows the construction of an intake system according to the present invention.
Figure 2:
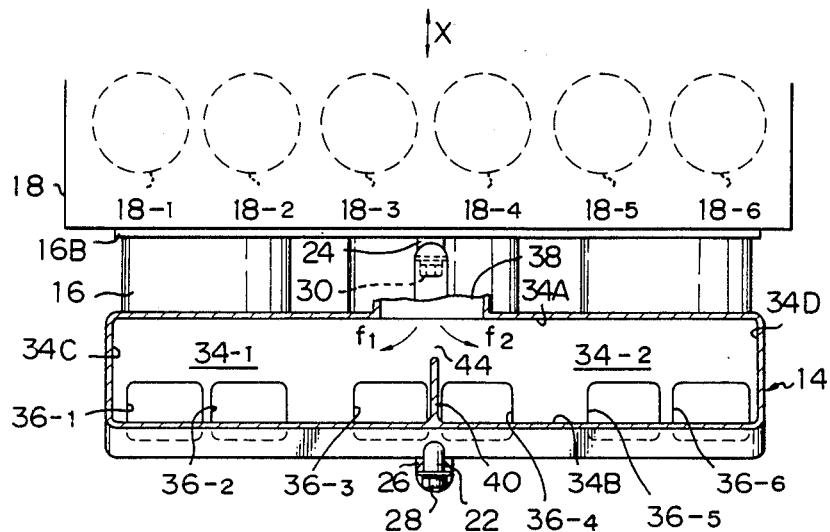
FIG. 2 shows a view taken along line II—II in FIG. 1.
Figure 3:
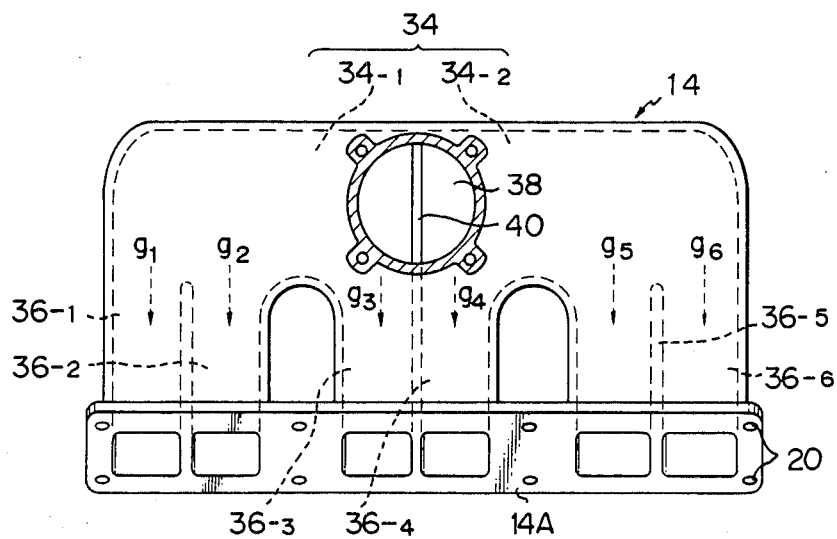
FIG. 3 shows a view taken along line III—III in FIG. 1.

In FIG. 1, reference numeral 10 designates a throttle body of a tubular shape in which a throttle valve 12 is rotatably arranged. A surge tank 14 defining therein an expansion chamber is arranged downstream of the throttle body 10. The surge tank 14 is connected, via connection pipes 16, to an engine body 18. The engine has in this embodiment six cylinders 18-1, 18-2, 18-3, 18-4, 18-5, and 18-6 (FIG. 2). These cylinders are ignited in the order of the first (#1) cylinder, the fifth (#5) cylinder, the third (#3) cylinder, the sixth (#6) cylinder, the second (#2) cylinder, and the fourth (#4) cylinder. The surge tank has, at its downstream end, a flange 14A while the connection pipes 16 have at their upstream ends a common flange 16A. These flanges 14A and 16A are connected to each other by means (not shown) such as bolts and nuts. In FIG. 3, the flange 14A has a plurality of holes 20 through which the bolts pass. In FIG. 2, the connection pipes 16 have at their downstream ends a common flange 16B which is connected to the engine body 18. The surge tank 14 has an integral projection (boss portion) 22 at the outside of the tank 14 opposite the engine body 18. The engine body 18 is provided with an integral projection (boss portion) 24 at a position located below the connection pipes 16. A stay 26 made of a metal pipe is arranged between the boss portions 22 and 24. The stay 26 has flattened ends which are connected to the respective boss portions 22 and 24 by means of bolts 28 and 30, respectively. During the operation, the engine attains vibration in a horizontal direction, as shown by the arrow X, which is transverse to the direction along which the cylinders are arranged and attains vibration in a vertical direction which is transverse to the plane of FIG. 1. The stay 26 strengthens the intake system, including the surge tank 14, with respect to such vibration of the engine in horizontal and vertical directions.

As is shown in FIG. 1, the throttle body 10 is connected to a flexible tube 30 which is connected to an air flow meter and an air cleaner.

The surge tank 14 is provided with an expansion chamber 34 (FIG. 3) which extends in the direction where the cylinders are arranged and has a rectangular cross-sectional shape. The expansion chamber 34 has faced inner side walls 34A and 34B, an inner front wall 34C, an inner rear wall 34D, an inner upper wall 34E, and a bottom wall 34F. The surge tank 14 further has pipe portions which extend from the expansion chamber 34. The pipe portions have formed therein branch passageways 36-1, 36-2, 36-3, 36-4, 36-5, and 36-6 which are open inside the expansion chamber 34 at the bottom wall 34F. The surge tank 14 further has a tubular portion in which an inlet 38 is formed so that it is open inside the expansion chamber 34 at the side wall 34A facing the engine body 18. The inlet 38 is connected to the throttle body 10. An inner partition member 40 integrally extends from the inner surface 34B at its center portion toward the end of the inlet 38 which is open to the chamber 34 at the faced inner wall 34A so that the chamber 34 is divided into a left-side first portion 34-1 and a right-side second portion 34-2. The branch passageways 36-1, 36-2, and 36-3 of the first group of cylinders #1, #2, and #3 located in the left half of the engine body 18 are open to the first portion 34-1 of the expansion chamber 34. The branch passageways 36-4, 36-5, and 36-6 of the second group of cylinders #4, #5, and #6 located in the right half of the engine body are open to the second portion 34-2 of the expansion chamber 34. The partition 40 terminates at about the middle of the chamber 34 so that its free end 40' (FIG. 1) is spaced from the front wall 34A of the expansion chamber 34. As a result of this construction, a communication passageway 44 is formed between the partition wall 40 and the front wall 34A in order to connect the left-side expansion passageway portion 34-1 and the right-side expansion passageway portion 34-2 to each other. As is shown in FIG. 1, the partition 40 has a triangle shaped projection 40B at the bottom portion of the wall 40 which allows a cold start injector 50 to be mounted as shown by the broken line.

As is shown in FIGS. 1 and 2, the partition wall 40 defines a plane which is transverse to the engine body 18, in which plane the boss portion 22 on the outer surface of the surge tank 14 opposite the inner surface 34B is located. This arrangement of the boss portion 22 with respect to the partition wall serves to strengthen the surge tank 14, allowing the use of a smaller-thickness material for the surge tank. Therefore, a required volume of the expansion chamber is obtained irrespective of the arrangement of the partition wall 40 in the surge tank 14.

Now the operation of the present invention will be described. Air from the air cleaner and air flow sensor (not shown) is introduced into the throttle body 10, in which the throttle valve 12 is arranged. The air from the throttle valve 12 is introduced into the expansion chamber 34 of the surge tank 14 via the inlet 38. The air from the inlet 38 is introduced into the first and the second expansion passageway portions 34-1 and 34-2, as shown by the arrows $f_1$ and $f_2$ (FIG. 2), respectively, which portions are defined by the partition wall 40. The air in the portions 34-1 and 34-2 is introduced into the branch passageways 36-1, 36-2, 36-3, 36-4, 36-5, and 36-6 of the cylinders #1, #2, #3, #4, #5, and #6, as shown by the arrows $g_1$, $g_2$, $g_3$, $g_4$, $g_5$, and $g_6$ (FIG. 3), respectively. The air in the branch passageways is then introduced via respective passageways in the connection pipes 16 into the cylinders 18-1, 18-2, 18-3, 18-4, 18-5, and 18-6, respectively, in the engine body 18.

According to the present invention, the first and the second expansion chamber portions 34-1 and 34-2, which are connected to the first group of cylinders 18-1, 18-2, and 18-3 and the second group of cylinders 18-4, 18-5, and 18-6, respectively, are separated from each other by the partition wall 40. Since the ignition order is cylinder #1, cylinder #5, cylinder #3, cylinder #6, cylinder #2, and cylinder #4, the ignition strokes alternately take place between the first and the second groups of cylinders. This means that every two branch passageways of the respective cylinders attaining the adjacent intake strokes are separated from each other by the partition wall 40. This enables the pressure wave generated in an intake port of one particular cylinder to be effectively maintained without being weakened by the pressure wave generated in the intake port of another cylinder attaining a subsequent intake stroke to prevent so-called intake interference. Since the pressure wave can be effectively maintained in the intake passageway, a so-called "inertial intake" operation is attained by suitably designing the dimension of the intake passageway so that the frequency of the intake wave varying in accordance with the engine rotational speed corresponds to the eigenfrequency of the intake system. As a result, the volumetric efficiency at a low speed range is enhanced, enabling an increased torque to be obtained at a designated speed. Furthermore, the first expansion passageway portion 34-1 connected to the first group of cylinders 18-1, 18-2, and 18-3 and the second expansion passageway portion connected to the second group of cylinders 18-4, 18-5, and 18-6 are connected to each other by the communication passageway 44. Therefore, it is possible to effectively use the air in the chamber 34 at a high rotational speed range. For example, suppose that a cylinder in the first group of cylinders connected to the first expansion chamber portion 34-1 attains an intake stroke. A flow of a certain amount of air into the first portion 34-1 from the second expansion chamber portion 34-2 is permitted through the communication passageway 44. The air is burnt in the combustion chambers, which prevents the torque from being decreased during an engine high speed condition.

Figure 4:
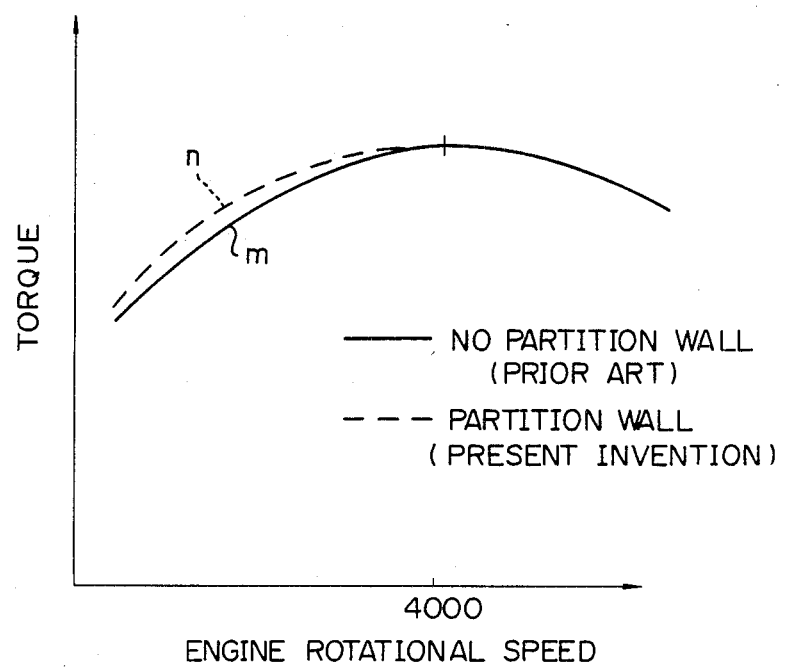
FIG. 4 shows the relationship between the engine rotational speed and the engine torque in accordance with the present invention in comparison with the prior art.

FIG. 4 shows the relationship between the engine rotational speed and the torque. A curve m is obtained when a conventional surge tank with no partition wall is used. A curve n is obtained when the surge tank of the present invention provided with the partition wall 40 is used. An increase in the torque at a low engine speed range is obtained without decreasing the torque at a high engine speed range.

We claim:

1. An intake system for an internal combustion engine, said engine being provided with a plurality of cylinders divided into first and second groups, between which ignition strokes take place alternately, said system comprising:

a tubular body through which intake air passes;
an expansion chamber having a predetermined length defining opposed faced first and second inner walls, said tubular body being open to the expansion chamber at the first wall;

means for defining a plurality of intake passageways each having a first end connected to the expansion chamber and a second end connected to the corresponding cylinder; and means for defining an inner partition in said expansion chamber, which partition extends from said second wall toward said first wall normal to said expansion chamber length and terminates at a fixed position spaced short from a plane forming the first wall so that the chamber is divided into first and second portions, connected to the first and second cylinder groups, respectively, and so that a communication passageway located completely within the expansion chamber is formed below said tubular body and between the partition and the second wall so that the first and the second expansion chamber portions communicate in a straight line with each other, such that a flow of air is allowed between the first and second portions when engine speed is high while preventing intake interference from occurring when the engine speed is low.

2. An intake system according to claim 1, wherein said expansion chasmber having an integral boss portion arranged on an outer wall of the expansion chamber opposite the partition, said boss portion being located on a plane same as that of the partition;

said engine body having a boss portion on one side thereof, on which side the expansion chamber is arranged;

a stay member arranged between the boss portion of the expansion chamber and the boss portion of the engine body;

first means connecting the stay member at its one end to the first boss portion; and second means for connecting the stay member at its other end to the second boss portion.

3. An intake system according to claim 1, wherein said defining means comprise a wall which is a one piece member with respect to the expansion chamber.

4. An intake system according to claim 3, wherein said exxpansion chamber has at an outer surface opposite the surface from which the partition extends an integral boss portion so that said boss portion is located on a plane same as that defined by the partition, said boss portion being adapted for mounting the intake system with the engine to strengtHen the intake system.

* * * * *